United States Patent
Gierer et al.

(10) Patent No.: US 6,232,693 B1
(45) Date of Patent: *May 15, 2001

(54) SWITCHED RELUCTANCE MOTOR HAVING STATOR INSERTS FOR NOISE REDUCTION, MAGNET POSITIONING, AND COIL RETENTION

(75) Inventors: Joseph T. Gierer, Glen Carbon, IL (US); Karmen D. Cox, St. Peters; George E. Hendrix, Florissant, both of MO (US)

(73) Assignee: Emerson Electric Co., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,436

(22) Filed: May 13, 1997

(51) Int. Cl.[7] ............................ H02K 21/00; H02K 21/04
(52) U.S. Cl. .......................... 310/214; 310/194; 310/181
(58) Field of Search .................................. 310/214, 168, 310/51, 254, 258, 181, 194

(56) References Cited

U.S. PATENT DOCUMENTS

| | | | |
|---|---|---|---|
| 660,459 | * 10/1900 | Reist | 310/214 |
| 747,698 | 12/1903 | Geisenhoner | 310/214 |
| 795,481 | * 7/1905 | Chitty | 310/214 |
| 2,465,820 | * 3/1949 | Sharrow et al. | 310/214 |
| 3,334,252 | * 8/1967 | Gayral | 310/214 |
| 3,875,437 | 4/1975 | Hara et al. | 310/49 |
| 3,959,672 | 5/1976 | Walker et al. | 310/36 |
| 4,322,649 | * 3/1982 | Troeder et al. | 310/194 |
| 4,484,114 | 11/1984 | Ebbs | 318/138 |
| 4,484,115 | 11/1984 | Takahasi | 318/254 |
| 4,575,652 | 3/1986 | Gogue | 310/49 R |
| 4,616,165 | 10/1986 | Compter | 318/701 |
| 4,698,537 | 10/1987 | Byrne et al. | 310/168 |
| 4,795,953 | 1/1989 | Compter et al. | 318/696 |
| 4,916,346 | 4/1990 | Kliman | 310/216 |
| 5,059,884 | 10/1991 | Shah et al. | 318/701 |
| 5,111,095 | 5/1992 | Hendershot | 310/168 |
| 5,345,131 | * 9/1994 | Torok | 310/181 |
| 5,386,162 | 1/1995 | Horst | 310/51 |
| 5,444,318 | * 8/1995 | Stumpf | 310/77 |
| 5,489,810 | * 2/1996 | Ferreira et al. | 310/54 |
| 5,604,388 | 2/1997 | Baker et al. | 310/51 |
| 5,650,682 | * 7/1997 | Smart | 310/181 |
| 5,877,572 | 3/1999 | Michaels et al. | 310/179 |

FOREIGN PATENT DOCUMENTS 39 05 997  * 8/1990 (DE) ................................ 310/214
0605247A  7/1994 (EP) .

* cited by examiner

Primary Examiner—Karl I. E. Tamai
(74) Attorney, Agent, or Firm—Howrey Simon Arnold & White, LLP

(57) ABSTRACT

A switched reluctance motor having a rotor and a stator is disclosed. The stator has a plurality of peripherally spaced stator poles, each being defined by an inner curvilinear face, which is generally aligned with the curvilinear faces of adjacent stator poles in a circumferential path. A plurality of stator inserts are also provided that are disposed between adjacently spaced stator poles. Each stator insert has a curvilinear face that is generally aligned in the same circumferential path with the curvilinear faces of adjacently spaced stator poles to reduce siren noise. Each stator insert is also constructed to include at least one pocket opposite its curvilinear face for receiving a magnet to facilitate positioning of the rotor relative to the stator poles. Each stator insert is further provided with oppositely extending arms for receiving and mounting a pre-wound stator coil or "wound-in-place" coils. A method of assembling the pre-wound coil relative to adjacent spaced stator poles and stator inserts is also disclosed.

12 Claims, 10 Drawing Sheets

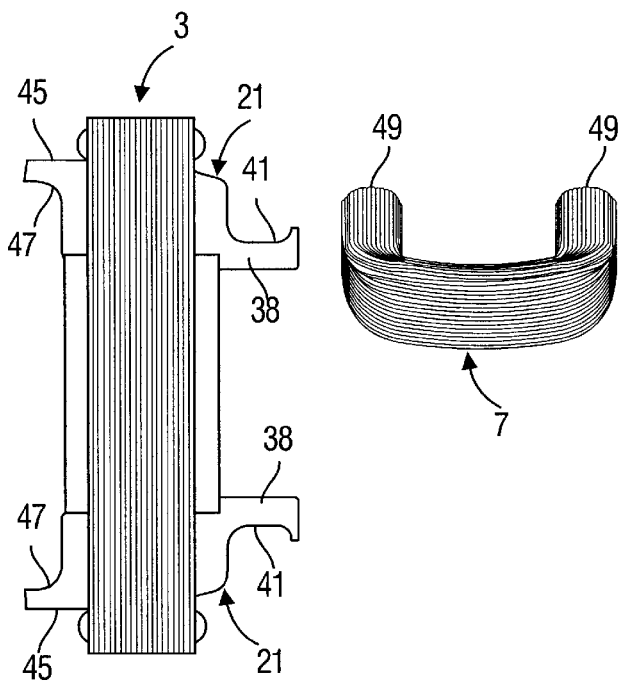
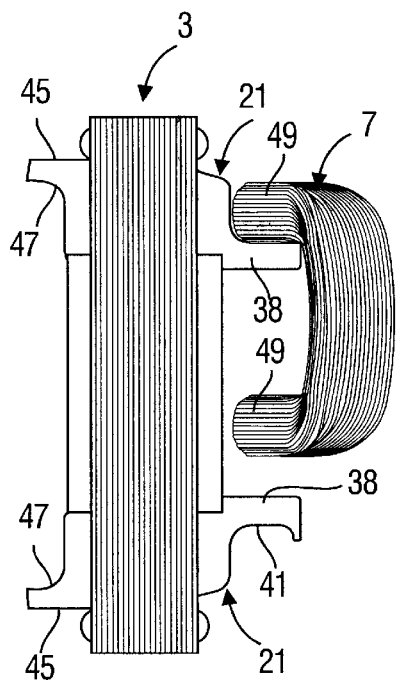
FIG. 16
FIG. 17
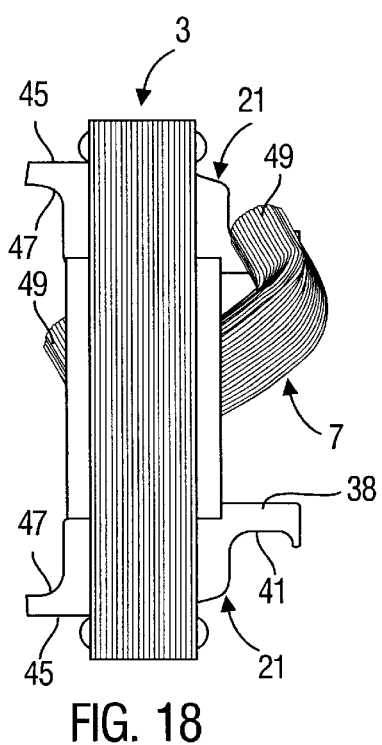
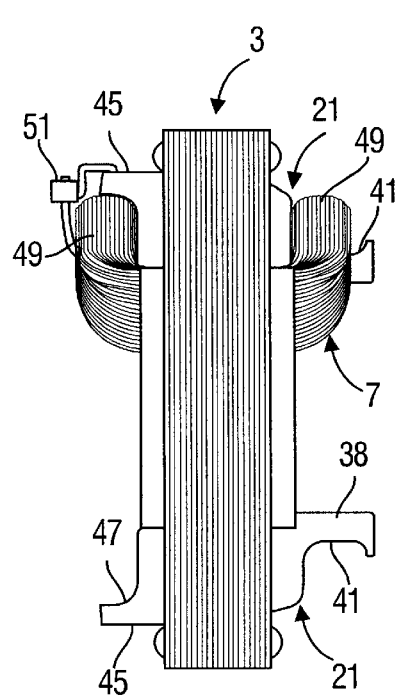
FIG. 18
FIG. 19

SWITCHED RELUCTANCE MOTOR HAVING STATOR INSERTS FOR NOISE REDUCTION, MAGNET POSITIONING, AND COIL RETENTION

FIELD OF THE INVENTION

The present invention relates generally to variable or switched reluctance motors ("switched reluctance motors"), and more particularly to improvements in switched reluctance motors that reduce noise, enhance the positioning of the rotor and stator poles, and facilitate the assembly of pre-wound and wound-in-place coils to adjacent stator poles.

BACKGROUND OF THE INVENTION

Switched reluctance motors have been used for years in a number of applications because they are generally more economical to run than other types of motors, such as brushless permanent magnet motors. This is due, in part, to the design of switched reluctance motors which have poles on both the rotor and stator, and phase windings only on the stator. Switched reluctance motors are generally more expensive than other types of less sophisticated motors, however, because they employ electronic circuitry for controlling the current in each of the motor phases. Although, with the cost of electronic circuitry reducing, switch reluctance motors are becoming more cost competitive. In fact, switch reluctance motors have recently been chosen over other types of motors for a number of applications. This is particularly the case in direct drive applications where the need for complicated gear trains is eliminated.

Known switched reluctance motors have several drawbacks and are still in need of improvement. For example, switched reluctance motors can make a siren noise that is caused by the interaction of the rotor and stator pole tips and the cavity spaces between the poles as the rotor turns inside the stator. Also, for single phase switched reluctance motors, unless the rotor and stator poles are properly aligned when the motor comes to rest, consistent motor start-up is not possible. In some positions, the motor will not even start. One solution to this later problem is to install permanent magnets in the stator assembly adjacent to the stator poles. A drawback with this solution, however, is that there is no quick, easy and economical technique for installing the permanent magnets within the coil windings.

The present invention seeks to eliminate or at least minimize some of these drawbacks.

SUMMARY OF THE INVENTION

In one aspect of the present invention, an improved switched reluctance motor is provided. The switched reluctance motor according to the present invention includes a rotor and a stator. The stator preferably has four equally spaced stator poles each having an inner curvilinear face, which is generally aligned with the curvilinear faces of adjacent stator poles in a circumferential path. A stator insert or mounting element is also provided that extends between adjacently spaced stator poles of the stator. Each stator insert has a curvilinear face that is generally aligned in the same circumferential path as the curvilinear faces of the adjacently spaced stator poles so as to reduce siren noise. Some of the stator inserts are also constructed to include at least one pocket opposite its curvilinear face for receiving a magnet that facilitates positioning of the rotor relative to the stator poles. In particular, the magnet functions to "park" the rotor in a position that allows for efficient motor start up. The stator insert is further provided with spaced and generally oppositely extending arms for receiving and mounting either pre-wound stator coils or for receiving coils wound in place.

In another aspect of the present invention, a method for assembling a pre-wound coil relative to adjacently spaced stator poles is provided. In the preferred method, a mounting element, such as the stator insert, is installed between adjacently spaced stator poles. The pre-wound coil is then secured to the adjacently spaced stator poles and spaced arms of the mounting element. The pre-wound coil is placed around two adjacent stator poles and secured to the mounting element by hanging it on a hook portion of the mounting element on one side and fastening it to a strut portion of the mounting element on the other. Alternatively, the coils can be directly wound over two adjacent stator poles and secured behind hooks in the inserts which are installed between the adjacent stator poles.

BRIEF DESCRIPTION OF THE DRAWINGS

Other aspects and advantages of the present invention will become apparent upon reading the following detailed description and upon reference to the drawings in which:

FIG. 16 is a side elevational view of the stator insert according to the present invention, illustrating the juxtaposition of a pre-wound stator coil relative to the stator core;

FIG. 17 is the same view as FIG. 16, and illustrates how the pre-wound stator coil is mounted to a hook portion of the stator insert;

FIG. 18 is the same view as FIG. 16, and illustrates how the pre-wound stator coil is further assembled to the stator insert;

FIG. 19 is the same view as FIG. 16, and illustrates the stator coil being secured by a fastening means to the stator insert;

DETAILED DESCRIPTION OF THE ILLUSTRATIVE EMBODIMENTS

Figure 1:
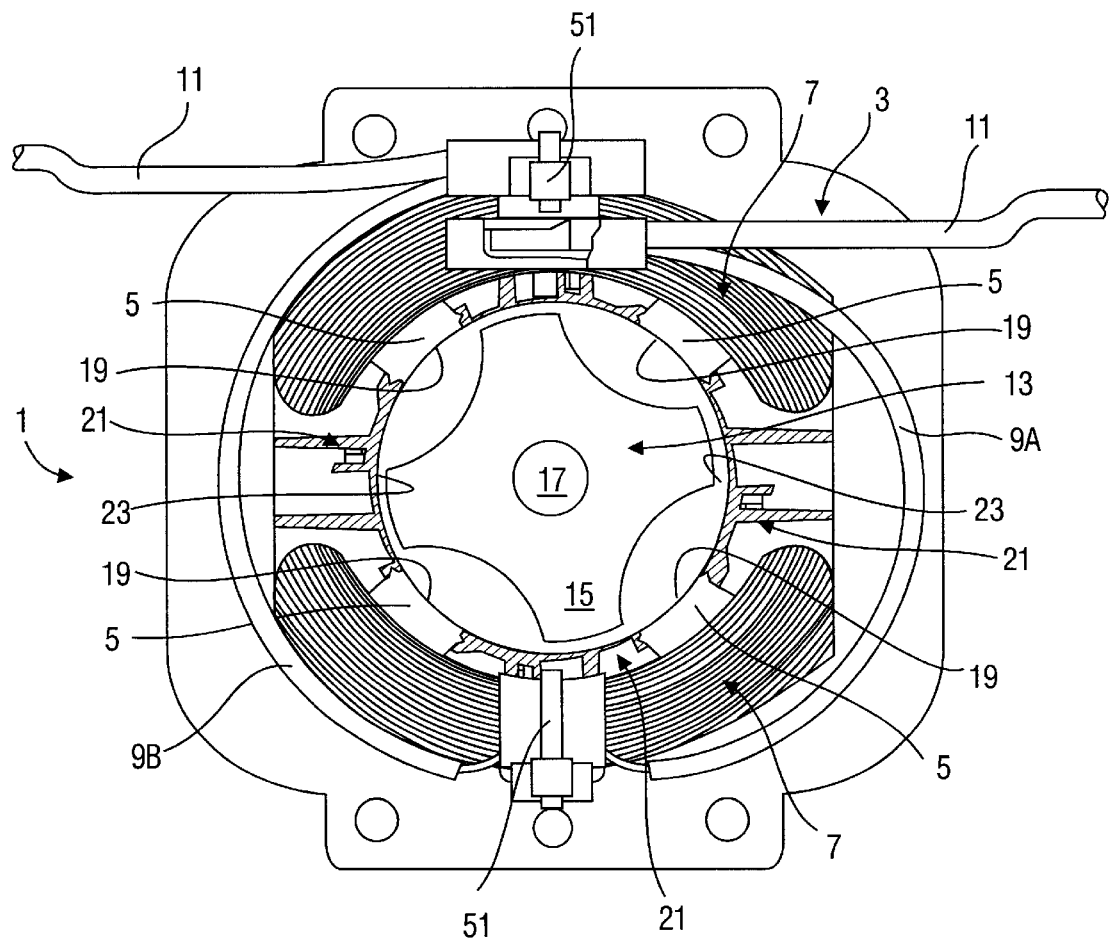
FIG. 1 is an elevational view of the top of a switched reluctance motor stator incorporating the features of the present invention.
Figure 2:
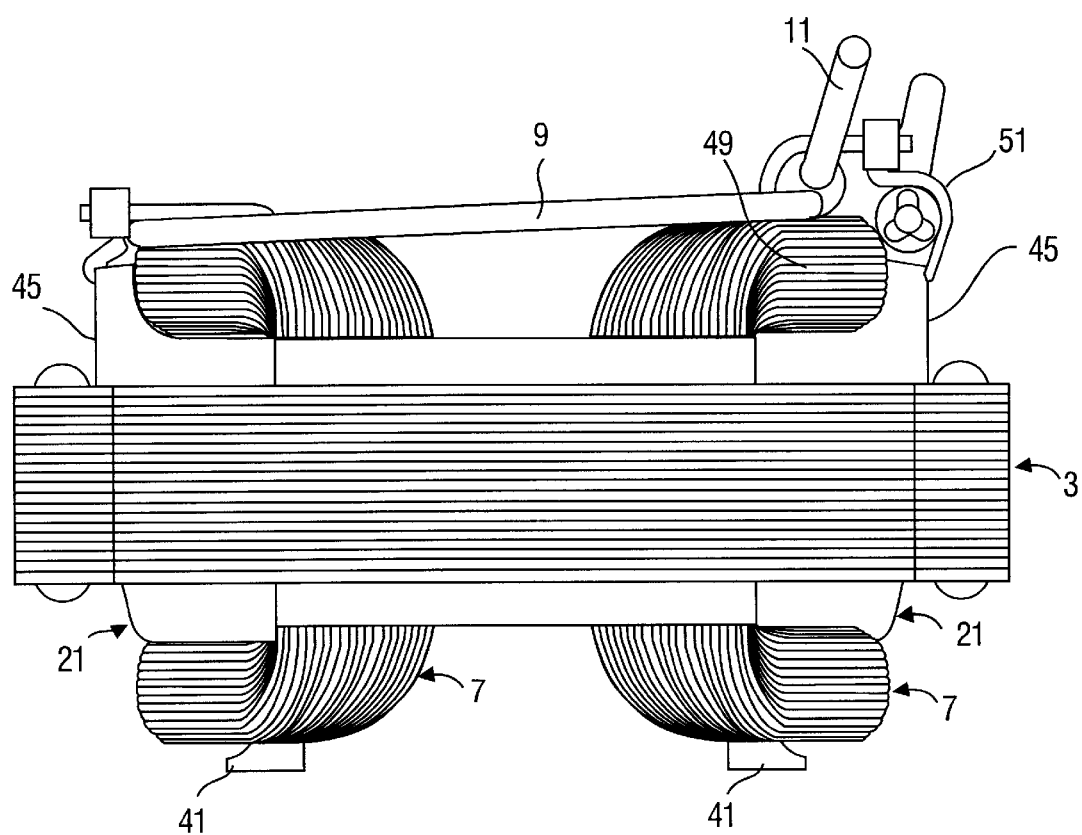
FIG. 2 is an elevational view of a side of the switched reluctance motor stator shown in FIG. 1.
Figure 3:
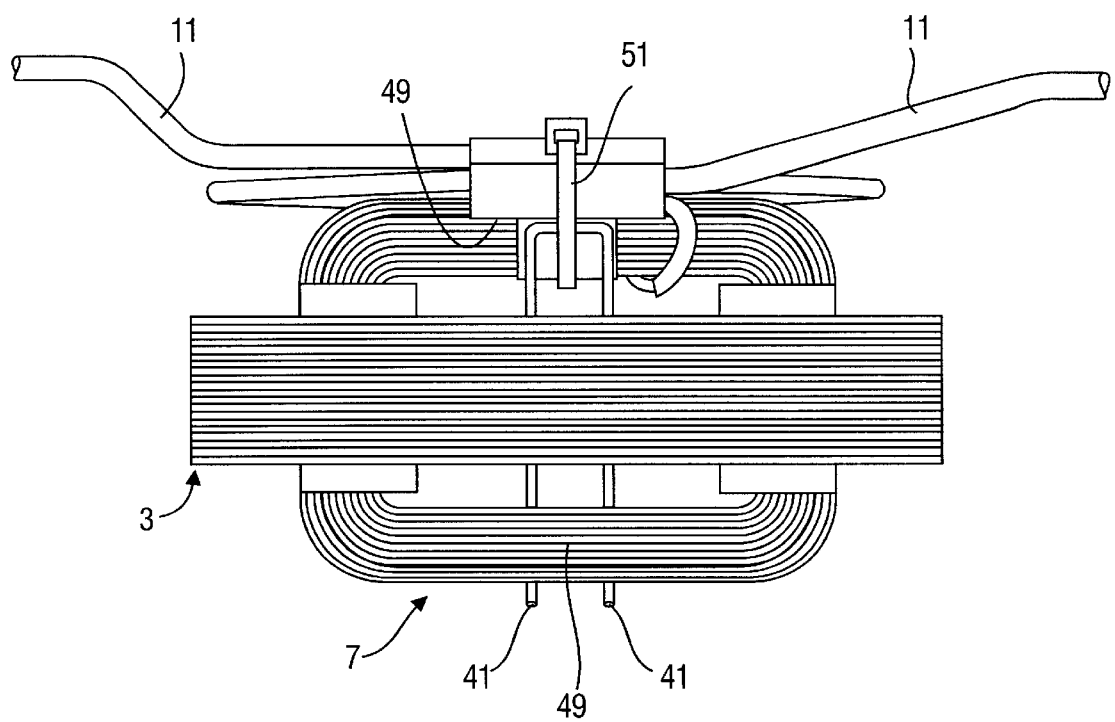
FIG. 3 is a front plan view of the switched reluctance motor stator shown in FIG. 1.

Turning now to the drawings and referring initially to FIG. 1, a preferred embodiment of a single phase switched reluctance motor stator assembly 1 will be described. The stator assembly 1 has a stator core 3, which is formed from a series of similarly constructed stacked stator laminations provided with four equally spaced stator poles 5 arranged in a circumferential path, as shown in FIGS. 1–3. Pre-wound stator coils 7 of copper magnetic wire are positioned relative to sets of adjacently positioned stator poles 5, as best seen in FIG. 1. Wire leads 9A and 9B connect the stator coils 7 in parallel with one another, while leads 11 connect both stator coils 7 to a suitable power source, as will be understood by those of skill in the art.

The switched reluctance motor assembly 1 also includes a rotor 13, which is constructed from similarly shaped rotor laminations. The rotor 13 preferably has four equally spaced poles 15. The rotor 13 is suitably journaled in bearings (not shown) typically mounted in the end bells (not shown) of the motor. In accordance with typical motor operation, the rotor poles 15 of the rotor 13 are driven by the stator poles 5 and stator coils 7 when the coils are energized through a suitable power source (not shown). It is assured that those skilled in the art understand the principles of electromagnetism and therefore it will not be further described herein how the rotor rotates relative to the stator.

One of the problems associated with switched reluctance motors is that the interaction between the stator poles 5 and rotor poles 15, as well as the cavity spaces between the poles, creates undesirable siren noise as the rotor 13 turns inside of the stator 3. It is also well known that for single-phase switched reluctance motors it is desirable to locate the rotor 13 in a predetermined position when the motor 1 is at rest in order to provide for efficient motor start-up in the correct direction when the motor is energized. Typically, magnets are used for this purpose; however, they must be suitably located and secured relative to the stator 3. The present preferred embodiments provide a uniquely constructed stator insert that not only reduces siren noise and facilitates the holding of magnets which position the rotor poles 15 relative to the stator poles 5, but further provides a method of quickly, easily and economically assembling a pre-wound stator coil relative to adjacently positioned stator poles, utilizing novel procedural steps, all of which will now be described. Furthermore, these same inserts can also be modified to allow for an automatic "wind-in-place" coil assembly.

As best illustrated in FIGS. 1 and 4–9, a stator insert or mounting element 21 is uniquely constructed to extend between adjacently spaced and positioned stator poles 5. Since there are four stator poles 5 in the switched reluctance motor 1 illustrated in the drawings, there are four stator inserts 21, each one of which extends between adjacently spaced stator poles 5. Each of the stator inserts 21 is arranged to extend between adjacent stator poles 5 in order to eliminate the cavity spaces between adjacently spaced stator poles 5, and thus substantially prevents or eliminates siren noise from occurring in the switched reluctance motor 1.

Figure 4:
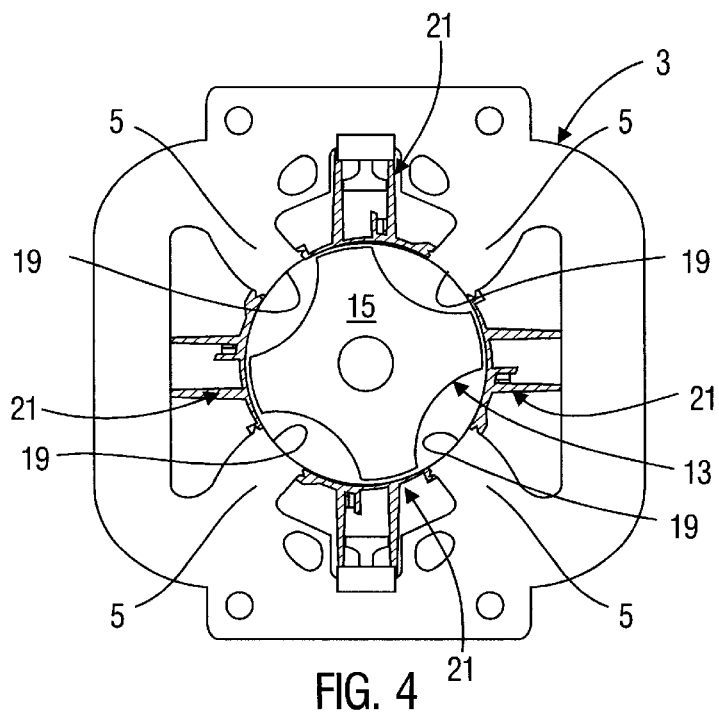
FIG. 4 is a fragmentary top elevational view of the switched reluctance motor stator shown in FIG. 1, illustrating stator inserts according to the present invention.
Figure 5:
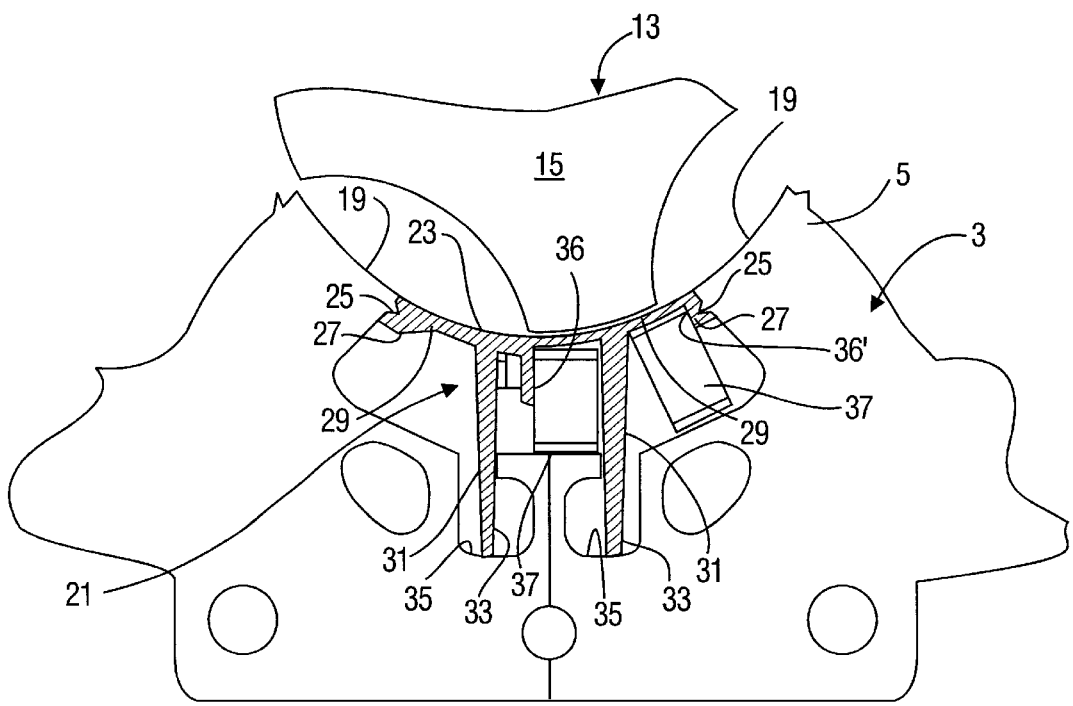
FIG. 5 is an enlarged partial top elevational view of the switched reluctance motor stator illustrating the construction of the stator insert of the present invention.
Figure 6:
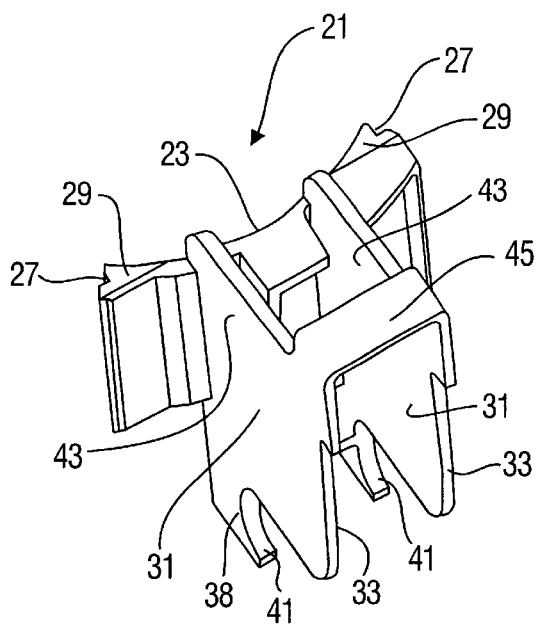
FIG. 6 is a rear top perspective view of the stator insert of the present invention.

Each of the peripherally spaced stator poles 5 has a curvilinear face 19 formed as a generally cylindrically shaped section that is aligned with the curvilinear faces 19 of adjacent stator poles 5 in a circumferential path, as shown in FIG. 1. Each stator insert 21 is constructed to extend between adjacently spaced stator poles 5 and thus eliminate the cavity spaces between adjacent stator poles 5, as shown in FIGS. 4 and 5. Each stator insert 21 has a curvilinear face 23 formed in a cylindrically shaped section, which is generally located in the same circumferential path as the curvilinear faces 19 of adjacently spaced stator poles 5. By eliminating the cavity spaces between adjacent stator poles 5, the stator inserts 21 thus prevent the interaction between the stator poles 5 and rotor poles 15. As a result, siren noise is substantially dissipated or eliminated.

Figure 9:
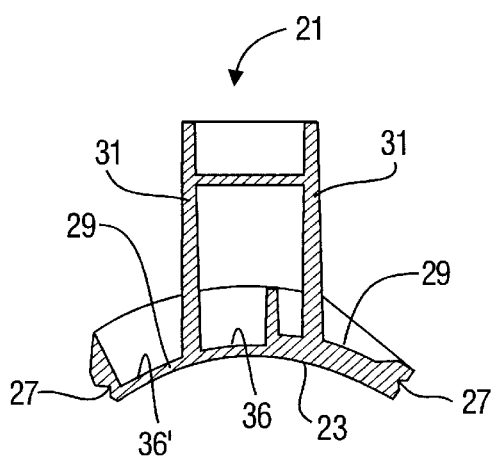
FIG. 9 is a cross sectional view of the stator insert of the present invention.

The stator insert 21 is attached to adjacently spaced stator poles 5 through complementary fastening means, as shown in FIG. 5. In this regard, adjacently spaced stator poles 5 have generally opposed and laterally extending shoulders 25 that are received within complementary openings 27 of curvilinear arms 29 of the stator insert 21. In an alternate design, the outer edges of the curvilinear arms 29 have laterally extending shoulders that are received in openings formed in the adjacently spaced stator poles 5. As best seen in FIG. 9 of the drawings, the curvilinear arms 29 do not have the same thickness. One of the curvilinear arms 29 is thinner than the other so as to accommodate magnet pockets further described below.

Extending generally transversely to the curvilinear arms 29 are a spaced pair of lateral struts 31, as shown in FIGS. 5–9. An outer end 33 of each lateral strut 31 preferably engages an inner wall 35 in spaced openings formed in the stator 3 so as to provide strength, rigidity and support to the stator insert 21 between the adjacently spaced stator poles 5. It should be appreciated that the insert could alternatively have one, three or more lateral struts as desired.

Each of the stator inserts 21 is preferably provided with two pockets 36 and 36' that are integrally formed in one of the curvilinear arms 29 on the side opposite to the circumferential face 23, as shown in FIGS. 5 and 9. The pocket 36 is positioned close to the geometric center of the stator insert 21, whereas the pocket 36' is positioned closer to the outer end of the curvilinear arm 29 in which it is formed. The pockets 36 and 36' are designed to receive magnets 37. Each magnet 37 is secured within its associated pocket 36, 36' by suitable fastening means such as a bonding adhesive or by forming the pockets with a restricted opening that holds each magnet 37 in a fixed position within the pocket.

By locating and securing one or more magnets 37 in a respective pocket 36, 36' of the stator insert 21 on an opposite side from the circumferential face of the stator insert, each magnet 37 is located and secured inside the stator 3 in proximity to the rotor poles 15, as shown in FIG. 5. As a result, the magnets 37 serve to hold the rotor poles 15 in the desired position for efficient motor start-up when the motor 1 is energized by a suitable power source.

The desired start-up condition for the motor 1 is when the rotor 13 comes to rest in a position where the rotor poles 15 are "advanced" by about 30 degrees of the stator poles 5, i.e., where the rotor poles 15 are out-of-phase from the stator poles 5 by about 30 degrees in the clockwise direction (assuming a counter-clockwise rotation during operation). This condition is illustrated in FIGS. 12–15. In this position, when the stator coils 7 are energized, the torque applied to the rotor poles 15 is a maximum.

Other start-up positions may be less desirable. For example, there is at least one position the rotor 13 can assume that causes the motor 1 to "lock up". This occurs when there is direct or nearly direct alignment of the rotor poles 15 with the stator poles 5. The motor 1 cannot be restarted in this situation, unless the rotor position is reset. Another undesirable start-up condition occurs when the rotor 13 comes to rest in an excessively "advanced" position, i.e., where it is out-of-phase in the clockwise direction by more than 45 degrees. This situation will cause the motor 1 to start up in the wrong direction.

Proper positioning of the magnet pockets 36, 36' and associated magnets 37 can eliminate the above mentioned problems. Proper positioning of the magnets 37 also eliminate a problem known as dithering. Dithering is when a rotor oscillates near the desired preset position, but for a relatively long time period, which will delay or momentarily pause motor startup after the motor is switched on. Dithering can be caused when the motor is bumped or rocked just prior to motor start-up. Tight detention of the rotor 13 prior to start-up is therefore very important. The magnets 37 accomplish this, i.e., they tightly detain the rotor 13 in a fixed position prior to start up.

Figure 10:
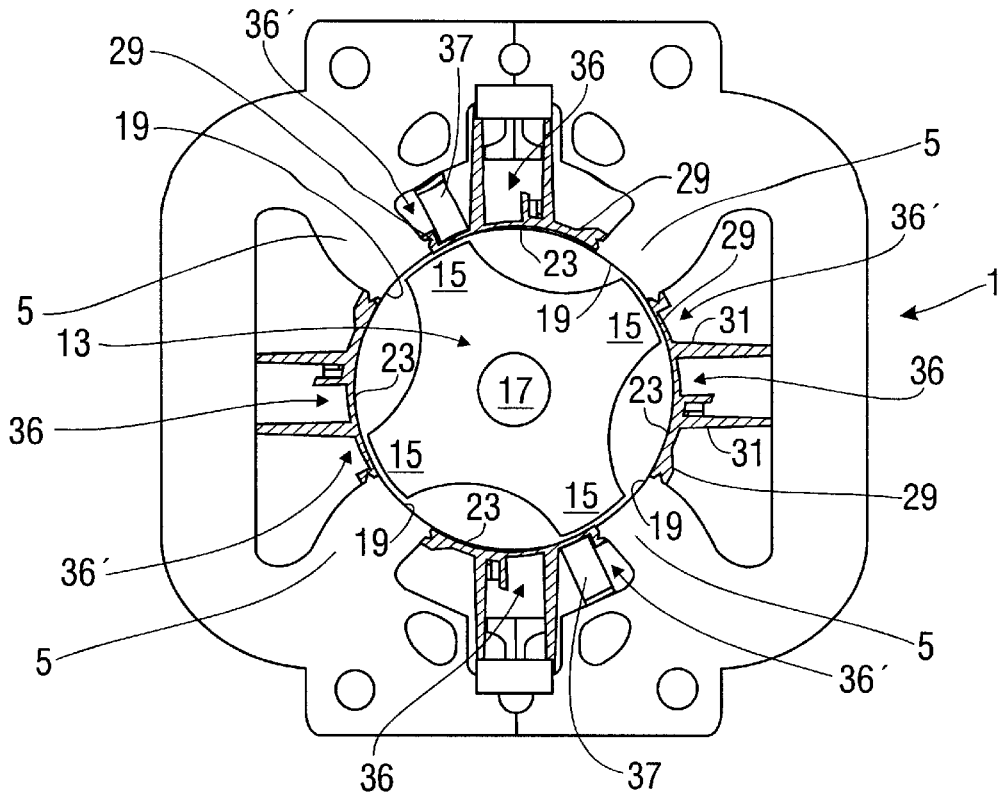
FIG. 10 illustrates a situation that could result in dithering for a stator configuration including a pair of opposing magnets.
Figure 11:
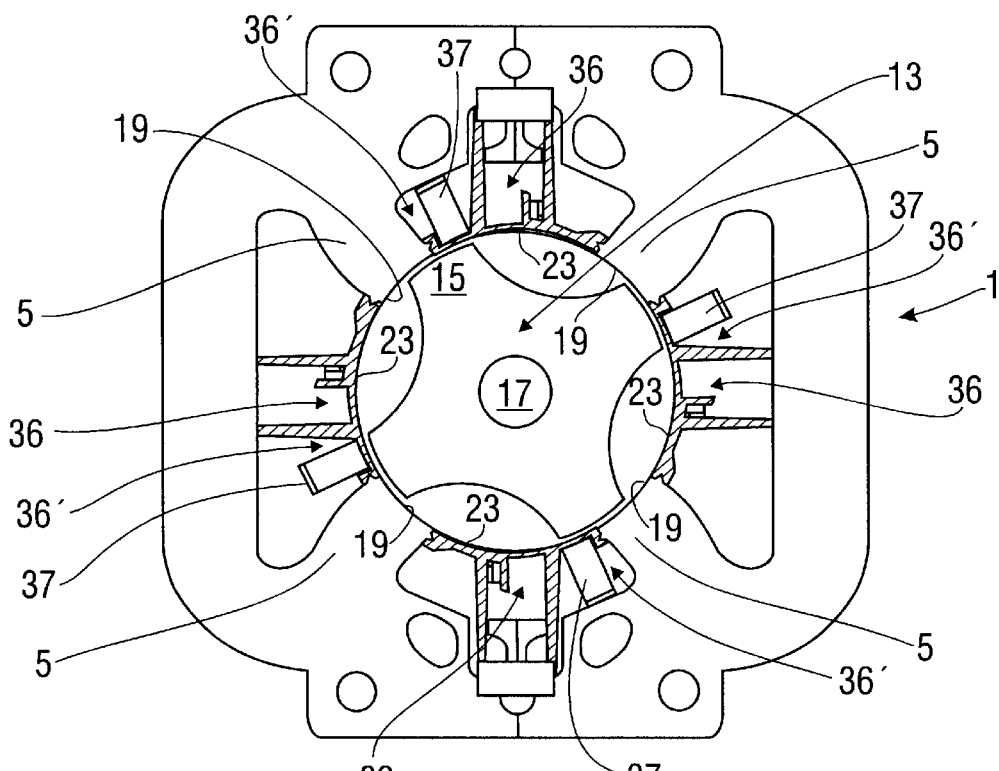
FIG. 11 illustrates another situation that could result in dithering for a stator configuration including several pair of opposing magnets.

Another common cause of dithering occurs when the stator magnets are positioned substantially 180 degrees apart as illustrated in FIGS. 10 and 11. In this configuration, the stator magnets act on the same corners of oppositely disposed rotor poles 15. This configuration of stator magnets can cause the rotor to take up any intermediate angular position, which can result in severe dithering.

Figure 12:
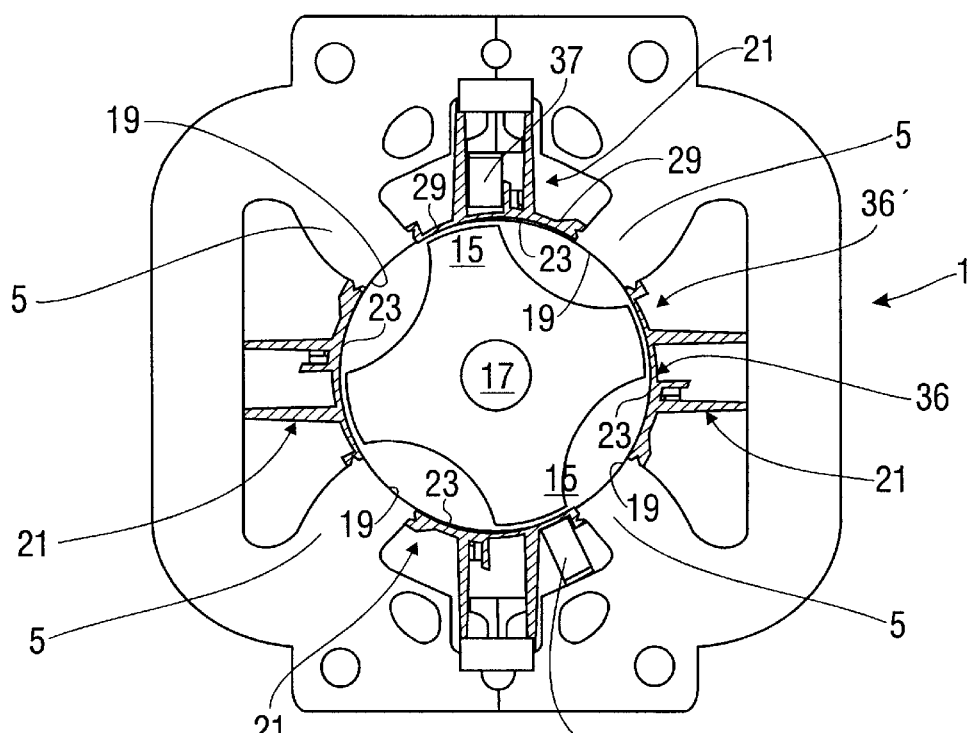
FIG. 12 illustrates the motor start position that the rotor assumes according to an embodiment of the present invention.
Figure 13:
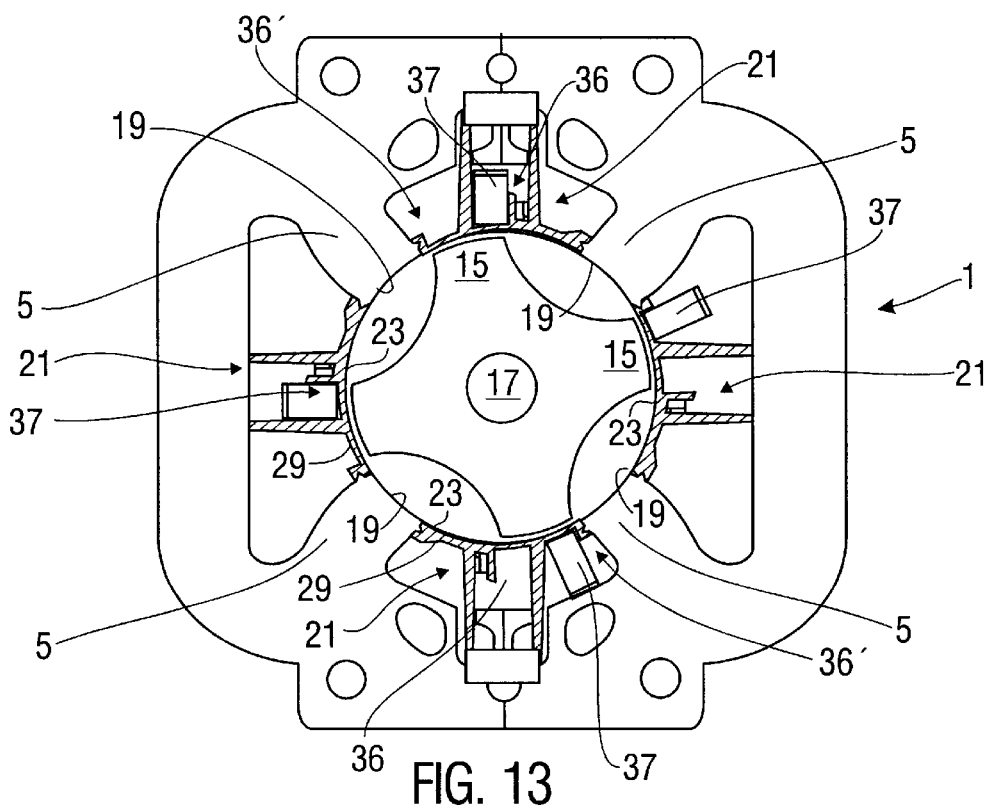
FIG. 13 illustrates the motor start position that the rotor assumes according to a modified embodiment of the one shown in FIG. 12.

In a preferred embodiment, the magnets 37 are configured as illustrated in FIG. 12. In this configuration, one magnet 37 is installed in the inner pocket 36 of the upper stator insert 21 and one magnet is installed in the outer pocket 36' of the lower stator insert 21. This arrangement enables the two magnets 37 to act on opposite corners of oppositely disposed rotor poles 15. This arrangement also provides for a tightly detained rotor 13. In this configuration, the rotor 13 is advanced from the stator 3 by approximately 30 degrees. As those of ordinary skill in the art will appreciate, this design may be modified using four magnets rather than two. This modified embodiment is shown in FIG. 13.

Figure 14:
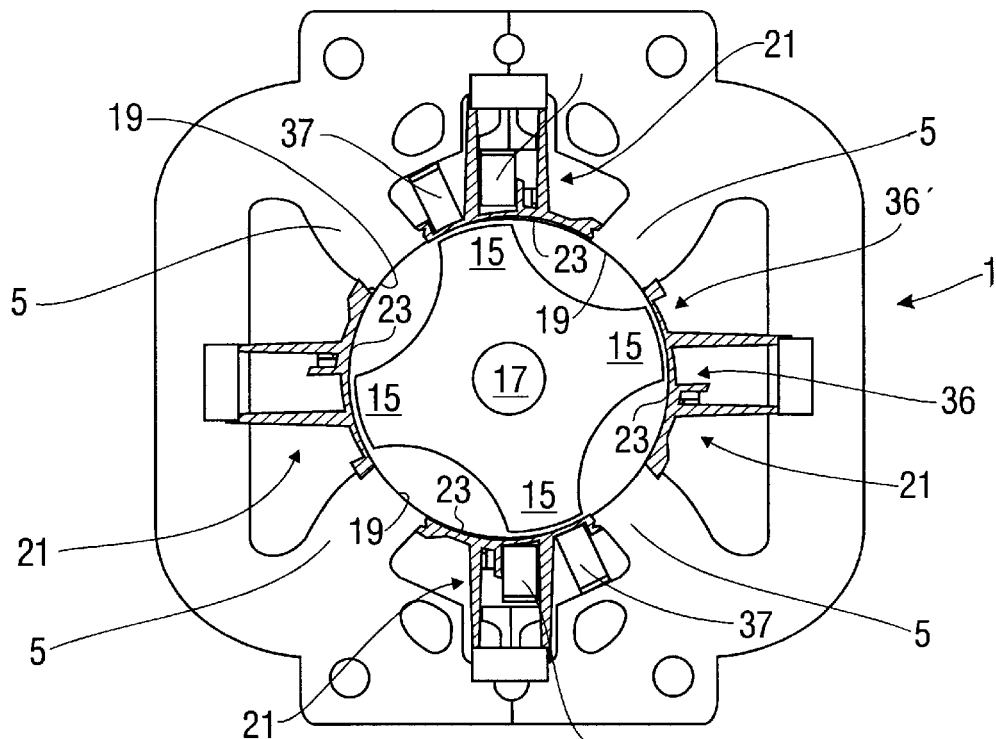
FIG. 14 illustrates the motor start position that the rotor assumes according to yet another embodiment of the present invention.

In a particularly preferred embodiment, the magnets 37 are configured as illustrated in FIG. 14. In this configuration, two magnets 37 are placed in each stator insert 21 instead of one. FIG. 14 shows magnets 37 installed in the inner pockets 36 of the upper and lower stator inserts 21 and in the outer pockets 36' of the upper and lower stator inserts. This arrangement enables adjacent magnets 37 to act on a substantial portion of the surface of the oppositely disposed rotor poles 15, and hence tightly detain the rotor 13. This arrangement provides a strong detaining force since virtually the entire faces of the opposing rotor poles 15 are exposed to magnetic forces. As those of ordinary skill in the art will appreciate, the four magnet configuration provides more attractive force on the rotor 13 than does the two magnet configuration.

Figure 15:
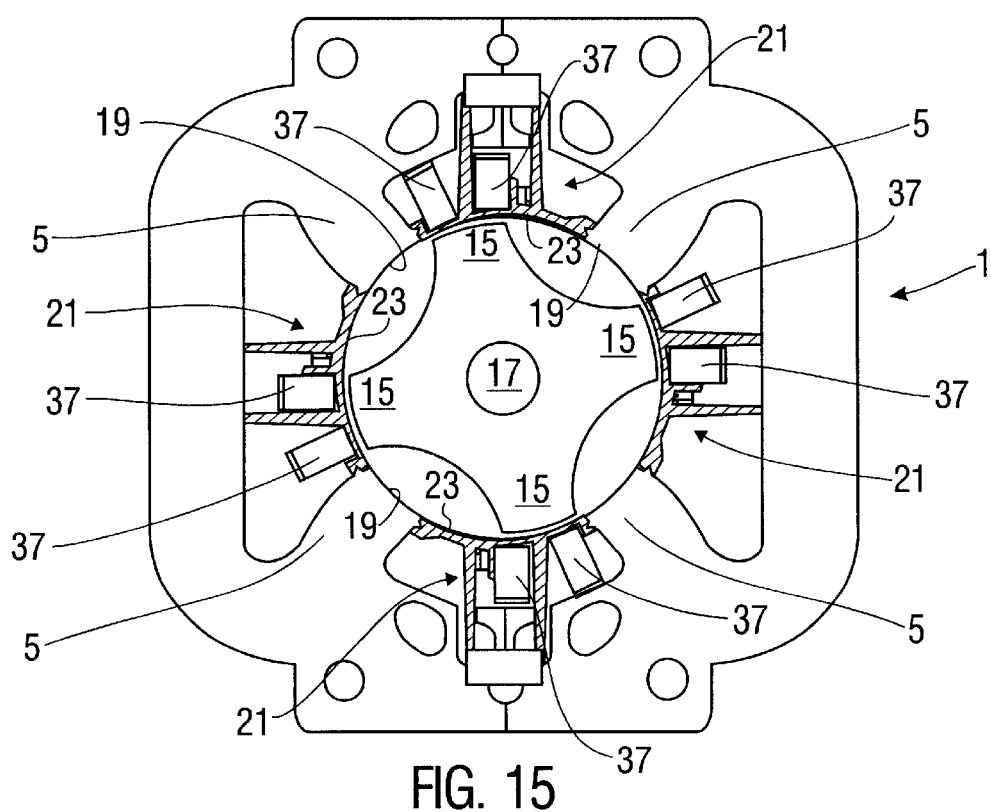
FIG. 15 illustrates the motor start position that the rotor assumes according to a modified embodiment of the one shown in FIG. 14.

FIG. 14 illustrates how adjacent magnets 37 act on the faces of two opposing rotor poles 15. In this configuration, the rotor 13 is also advanced from the stator 3 by approximately 30 degrees, and thus places the rotor within the desired range of positions that will insure efficient motor start-up. As those of ordinary skill in the art will appreciate, magnets 37 may be placed in the pockets 36 and 36' formed in the stator inserts 21 that are installed in the all the open cavities in the stator 3. This alternate embodiment is shown in FIG. 15.

In addition to eliminating siren noise and locating the rotor 13 in a predetermined position when the motor 1 is at rest, the stator insert or mounting element 21 is further constructed with additional features which facilitate the assembly of a pre-wound stator coil 7 to adjacent stator poles 5. Furthermore, the stator insert or mounting element 21 can be modified to facilitate direct wind-in-place methods as well.

Figure 7:
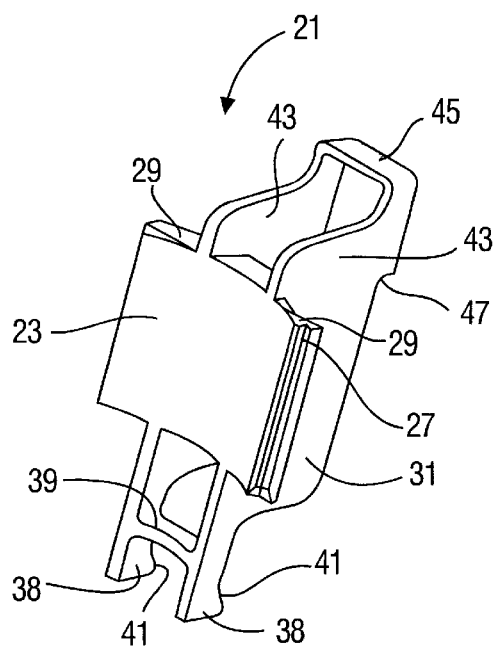
FIG. 7 is a front top perspective view of the stator insert of the present invention.
Figure 8:
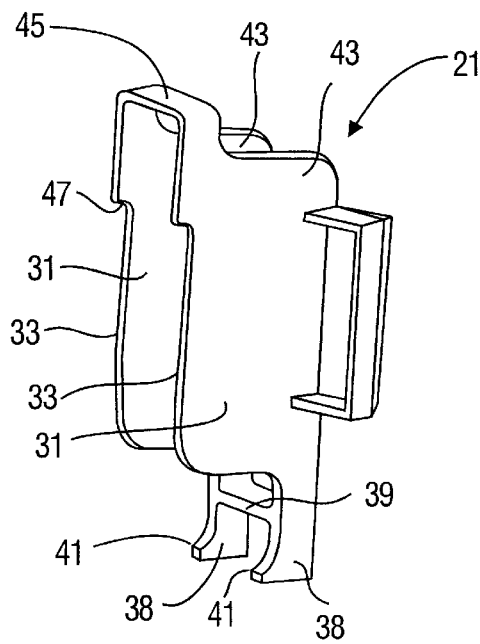
FIG. 8 is a side perspective view of the stator insert of the present invention.

In order to facilitate the assembly of a pre-wound stator coil 7 to adjacently spaced stator poles 5, the stator insert 21 includes spaced arms for receiving and mounting the pre-wound stator coil 7 relative to two adjacent stator poles. Specifically, beneath the spaced lateral struts 31, the stator insert 21 includes a pair of spaced lower arms 38, which are integrally connected to the lateral struts 31, as well as being integrally connected and may be supported by at least one intermediate lateral strut 39, as shown in FIGS. 7 and 8. The spaced lower arms 38 are each provided with a hook portion 41 at one end, which is provided to facilitate assembly of the stator coil 7, as described below. The spaced arms 38 also allow cooling air to circulate around the stator coil 7 thereby facilitating the cooling of the coil. As those of ordinary skill in the art will appreciate other configurations can be used for mounting the pre-wound stator coil 7, e.g., the stator insert 21 could be modified to have a single lower arm.

On an opposite side from the cylindrical face 23 of the stator insert or mounting element 21 are a pair of spaced upper arms 43 that extend upwardly from each of the spaced lateral struts 31 and are interconnected at one end by an upper integral strut 45, which enables a stator coil 7 to be secured to the stator insert or mounting element 21. Again, those of ordinary skill in the art will appreciate a single upper arm may also be used.

The stator coil 7 is mounted to the motor 1 as follows. First, the stator coils 7 are mounted to the stator inserts 21 in the endless configuration illustrated in FIGS. 1–3 and 16–19 of the drawings. The endless configuration can be described as a generally rectangularly shaped coil 7 which is bent along the mid-section of the two longest sides as at 49 into the pre-wound and pre-configured shape illustrated.

In FIG. 16 of the drawings, the pre-wound and pre-configured stator coil 7 is shown as positioned immediately adjacent to a stator insert 21. The assembly procedure begins, as illustrated in FIG. 17 of the drawings, by positioning the bent mid-section 49 along one of the longer sides of the rectangular shaped stator coil 7 over the hooked portion 41 of each of the spaced lower arms 38. As illustrated in FIG. 18, the stator coil 7 is then swung through an opening in the stator 3 in order to position the other bent midsection 49 of the stator coil within the curved channel 47 beneath the upper integral strut 45. This enables a tie-down fastener 51 or other similar fastening means to be looped around the upper integral strut 45 and below the bent mid-section 49 of the stator coil 7 in order to secure the stator coil 7 in the manner illustrated in FIG. 19 of the drawings. This is also illustrated in FIGS. 1–3 of the drawings where the stator coils 7 are shown as being supported relative to adjacently spaced stator poles 5 by intermediate stator inserts 21 of the motor 1.

Figure 20:
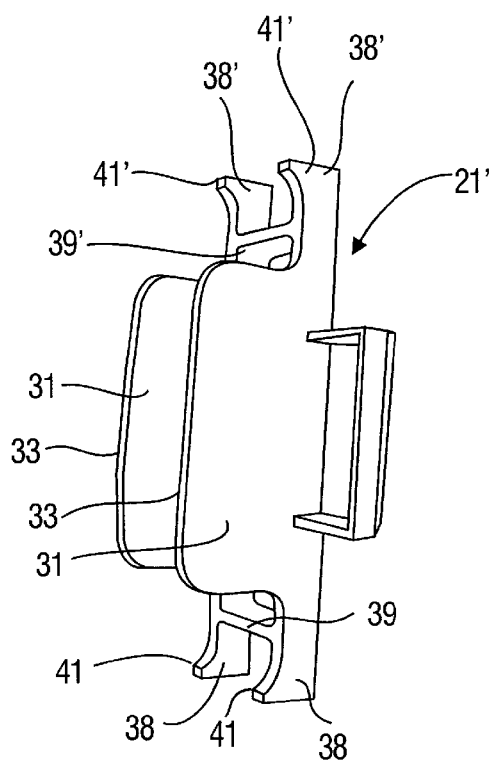
FIG. 20 is an oblique view of the stator insert of the present invention.
Figure 21:
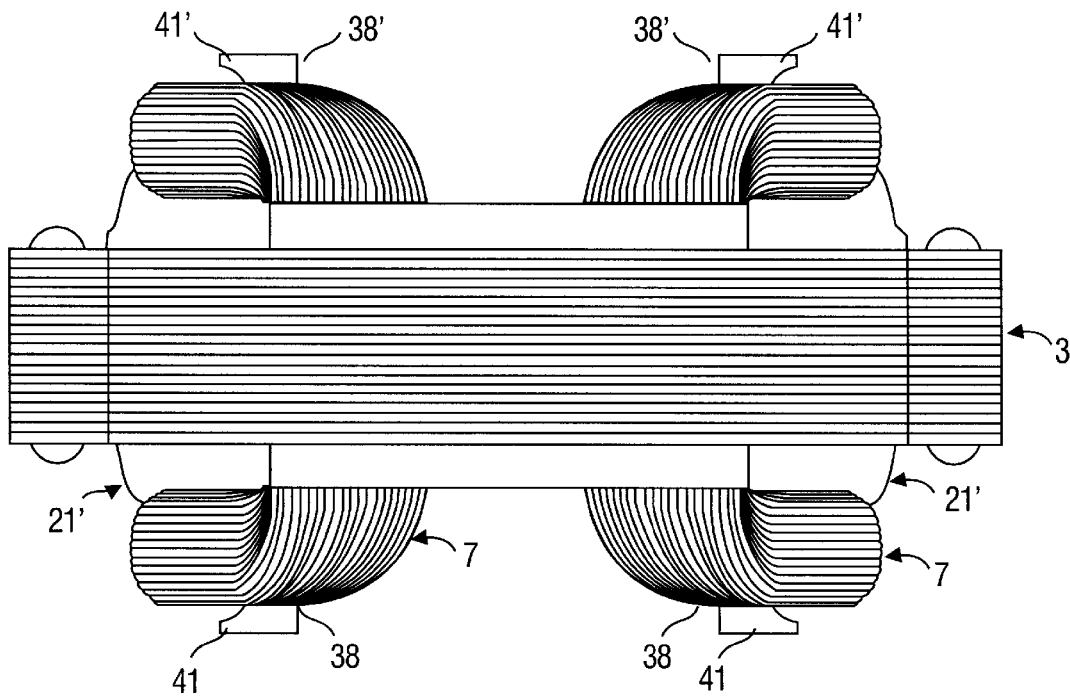
FIG. 21 is a side view of a stator assembly showing wound-in-place coils disposed on the stator inserts of the present invention.

As illustrated in FIGS. 20–21, in order to facilitate the assembly of a wound-in-place stator coil 7 to adjacently spaced stator poles 5, the stator insert 21 may be modified to include oppositely positioned pairs of spaced arms for receiving and mounting the stator coil 7 relative to two adjacent stator poles. Specifically, beneath the spaced lateral struts 31, the modified stator insert 21' includes opposing pairs of spaced lower arms 38 and 38', which are integrally connected to the lateral struts 31. The opposing pairs of spaced lower arms 38 and 38' are also integrally connected to, and supported by, a pair of intermediate lateral strut 39 and 39'. The opposing pairs of spaced lower arms 38 and 38' are each provided with hook portions 41 and 41' at one end, which are provided to facilitate wound-in-place assembly of the stator coil 7 using conventional wire coil winding-in-place methods. FIG. 21 illustrates the stator coil 7 after it has been wound-in-place around the modified stator insert 21'. As can be appreciated by those of ordinary skill in the art, a single lower arm on each side of the lateral struts 31 may also be utilized.

From the foregoing, it will now be appreciated that the stator insert or mounting elements 21 and 21' provide an improved single phase switched reluctance motor that not only reduces siren noise, but also facilitates positioning of rotor poles relative to stator poles by magnets mounted in pockets relative to the stator insert or mounting element. In most instances, the stator insert will be constructed to achieve at least both of the aforementioned functions. However, if also desired, the stator insert can be further provided with features which facilitate the assembling and securing of a pre-wound or wound-in-pace coil of copper magnet wire to one of the stator inserts or mounting elements, as described above.

Those skilled in the art who now have the benefit of the present disclosure will appreciate that the present disclosure may take many forms and embodiments. It is intended that the embodiments described herein should be illustrative only, and not limiting of the present invention. Rather, it is intended that the invention cover all modifications, equivalents and alternatives falling within the spirit and scope of the invention as defined by the appended claims.

What is claimed is:

1. A switched reluctance motor, comprising:
   a stator having a plurality of peripherally spaced stator poles and a corresponding plurality of open cavities disposed between adjacent stator poles
   a rotor mounted for rotation within the stator, said rotor having a plurality of peripherally spaced rotor poles; and
   a plurality of stator inserts installed in said open cavities, each of the stator inserts having a first pair of spaced arms for receiving and mounting a pre-wound stator coil, the first pair of spaced arms being connected to an integral strut at a first end and forming a hook portion at a second end, the hook portion for holding the pre-wound coil at said second end, the integral strut cooperating with a fastener to secure the pre-wound coil to the stator insert.

2. The switched reluctance motor according to claim 1, wherein each of the stator poles has a curvilinear face aligned with the curvilinear faces of adjacent stator poles in a circumferential path, and wherein each of the stator inserts has a curvilinear face that is generally aligned in the same circumferential path with the curvilinear faces of adjacently spaced stator poles so as to reduce noise during motor operation.

3. The switched reluctance motor according to claim 2, wherein each of the stator inserts has at least one pocket that is formed on the reverse side of its curvilinear face, said pocket being adapted to accommodate a magnet for parking the rotor in a position which will ensure reliable motor start up.

4. The switched reluctance motor according to claim 3, wherein each of the stator inserts has two pockets, one inner pocket that is disposed close to the geometric center of the insert and one outer pocket that is disposed close to one end of the stator insert.

5. The switched reluctance motor according to claim 4, wherein there are four stator poles, an associated four open cavities and four stator inserts, and four rotor poles.

6. The switched reluctance motor according to claim 5, wherein magnets are installed in both the inner and outer pockets of at least two oppositely disposed stator inserts, so as to park the rotor in a position which will ensure reliable motor start up.

7. The switched reluctance motor according to claim 6, wherein magnets are installed in both the inner and outer pockets of all the stator inserts, so as to park the rotor in a position which will ensure reliable motor start up.

8. The switched reluctance motor according to claim 5, wherein magnets are installed in the inner pocket of at least one stator insert and the outer pocket of another oppositely disposed stator insert, so as to park the rotor in a position which will ensure reliable motor start up.

9. The switched reluctance motor according to claim 8, wherein magnets are installed in the inner pockets of two of the stator inserts and the outer pockets of the oppositely disposed stator inserts, so as to park the rotor in a position which will ensure reliable motor start up.

10. A switched reluctance motor, comprising:
    a stator having a plurality of peripherally spaced stator poles and a corresponding plurality of open cavities disposed between adjacent stator poles;
    a rotor mounted for rotation within the stator, said rotor having a plurality of peripherally spaced rotor poles; and
    a plurality of stator inserts installed in said open cavities, each of the stator inserts having a first pair of spaced arms and a second pair of spaced arms positioned in opposing relation for receiving and mounting a wound-inplace stator coil, each of said first pair of spaced arms and said second pair of spaced arms being connected to integral struts at one end and forming hook portions at opposite ends.

11. A switched reluctance motor, comprising:
    a stator having a plurality of peripherally spaced stator poles each having an inner curvilinear face aligned with the curvilinear faces of adjacent stator poles in a circumferential path: and
    a plurality of stator inserts, each stator insert extending between adjacently spaced stator poles of the stator and having a curvilinear face that is generally aligned in the same circumferential path with the curvilinear faces of adjacently spaced stator poles so as to reduce noise, each stator insert having a pair of first spaced arms for receiving and mounting a pre-wound stator coil, the pair of first spaced arms being connected to an integral strut at a first end and forming a hook portion at a second end, the hook portion for holding the pre-wound coil at said second end, the integral strut cooperating with a fastener to secure the pre-wound coil to the stator insert.

12. A switched reluctance motor, comprising:

a stator having a plurality of peripherally spaced stator poles each having an inner curvilinear face aligned with the curvilinear faces of adjacent stator poles in a circumferential path: and a plurality of stator inserts, each stator insert extending between adjacently spaced stator poles of the stator and having a curvilinear face that is generally aligned in the same circumferential path with the curvilinear faces of adjacently spaced stator poles so as to reduce noise, each stator insert having a first pair of spaced arms and a second pair of spaced arms positioned in opposing relation for receiving and mounting a wound-in-place stator coil, each of said first pair of spaced arms and said second pair of spaced arms being connected to integral struts at one end and forming hook portions at opposite ends.

* * * * *